H. W. LAMB.
PROCESS OF FIXATION OF ATMOSPHERIC NITROGEN BY METAL CARBID.
APPLICATION FILED MAR. 18, 1914.
1,123,763. Patented Jan. 5, 1915.
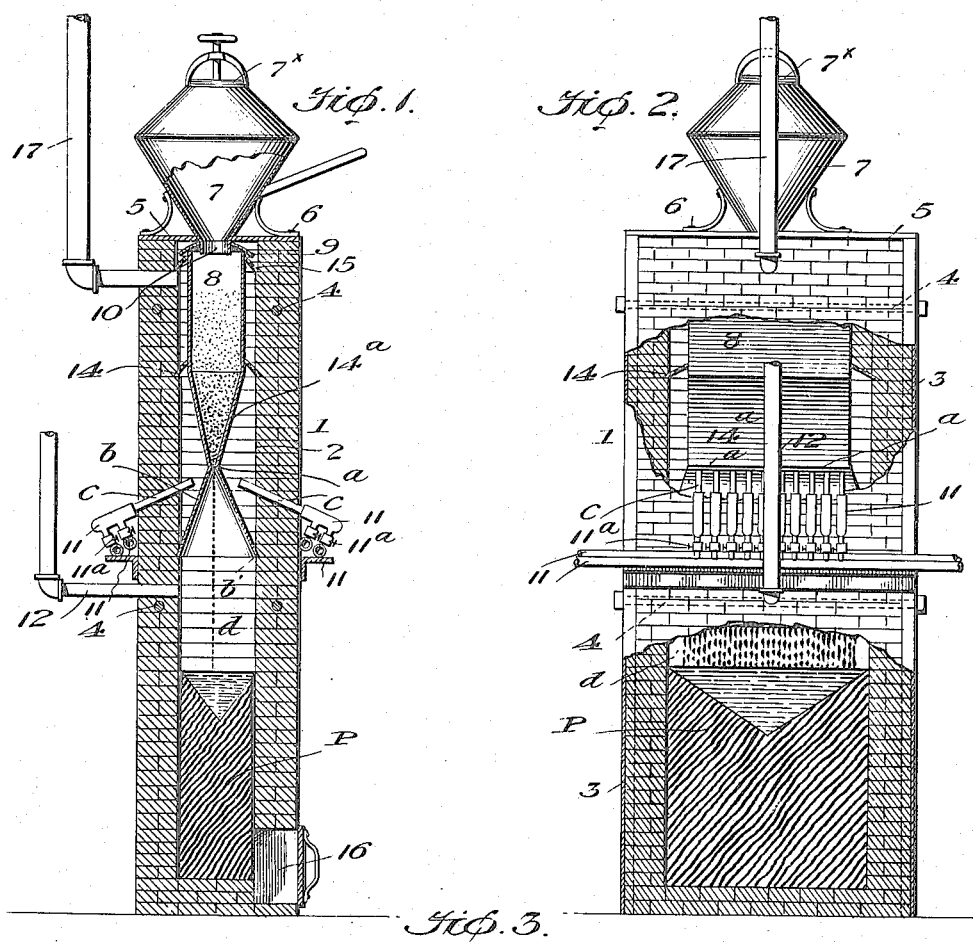
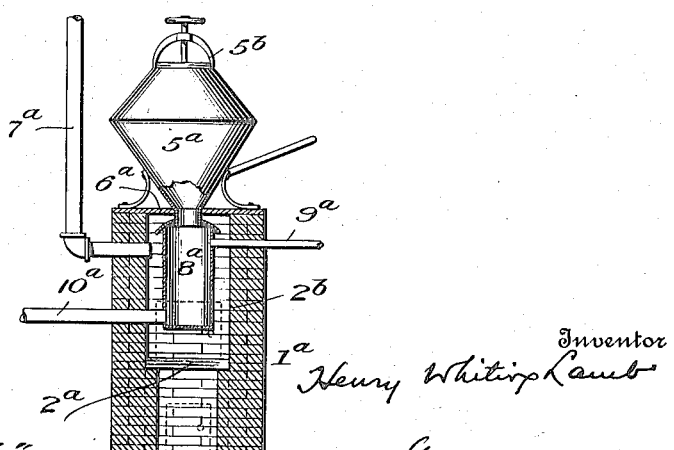

ued coke and to conduct the products of combustion to milk of lime in a suitable container such as an absorption tower, whereby the carbon monoxid or carbonic acid gas, $CO_2$ is absorbed and eliminated, leaving $N_3$ free. I do not, however, limit myself to the manner of deriving the nitrogen which is used in my process.

UNITED STATES PATENT OFFICE.

HENRY WHITING LAMB, OF PORTSMOUTH, VIRGINIA.

PROCESS OF FIXATION OF ATMOSPHERIC NITROGEN BY METAL CARBID.

1,123,763.    Specification of Letters Patent.    Patented Jan. 5, 1915.

Application filed March 18, 1914. Serial No. 825,590.

*To all whom it may concern:*

Be it known that I, HENRY WHITING LAMB, a citizen of the United States, residing at Portsmouth, county of Norfolk, State of Virginia, have invented a certain new and useful Process of Fixation of Atmospheric Nitrogen by Metal Carbids, of which the following is a specification.

This process relates to the fixation of atmospheric nitrogen in metallic carbid and the production of ammonia therefrom.

This process is based upon the fact that certain metal carbids are unsaturated and capable of forming additional products under the proper conditions and temperatures. Ferrous carbid $FeC_2$ has this property. Oxid of iron may be used with carbon derived from coke, coal, tar or pitch to obtain the requisite metal carbid or ferrous carbid.

The present process contemplates the fixation of atmospheric nitrogen by its absorption in liquid carbid derived from the liquefaction of oxid of iron, or oxid of iron combined with magnesium, barium or titanium, or iron oxid in combination with any other metal carbid, in the presence of coke, coal, tar, pitch or other carboniferous material, and, further, the production of ammonia by subjecting the cooled metal cyanid to hydrogen derived, for instance, from water or superheated steam.

The nitrogen which is to be absorbed by the liquid carbid, may be derived from the atmosphere in any known or preferred manner. I prefer to recover the nitrogen from the air by passing air over or through heat- In carrying out my process, oxid of iron $Fe_2O_3$, is mixed with coke, coal, tar or pitch, in sufficient proportions so that upon being heated in a crucible there will be produced a coked product containing carbon in such proportions as may be indicated by the chemical formula $FeC_2$. A mixture of such proportions as will produce this carbon compound is heated in a crucible in such manner that atmospheric air is excluded from contact therewith, the action being a reducing one, and as the mass passes through the zone of fusion of the crucible, it becomes liquefied and drips into an air-tight chamber as liquid metal carbid in the nature of a contact substance having the property of absorbing, combining, retaining or occluding nitrogen when in a heated state. Nitrogen is introduced into the air-tight chamber containing the liquefied metal carbid and is absorbed by the liquid metal carbid. The liquid cyanid thus formed remains as a liquid pool in the air-tight chamber into which it has dripped from the crucible or retort and solidifies on cooling, forming pigs of solid metal cyanid which, when cool, are withdrawn from the said air-tight chamber. The cooled pig is then crushed or pulverized and subjected to the chemical action of water or superheated steam, which giving up its hydrogen, causes the liberation of ammonia in gaseous form. The cumulative yield of ammonia can be absorbed in water, compressed to a liquid, or combined with other elements, forming compounds, composition or substitution productions, or, combined with acids to form salts or compounds, or, united in other forms of ammoniacal compounds or compositions.

The process may be augmented by exposing gaseous and solid agents, viz:—nitrogen, iron oxid and coke, to the chemical change, transformation or union while under super-atmospheric pressure and at certain critical temperatures. The temperatures may range from 1150° F. to 1850° F.

The reaction which occurs during the employment of iron oxid and coke in the transformation of nitrogen into nitrogen compounds and the delivery of the same to the hydrogen of the water or steam, in the presence of hydrogen may be illustrated by the following formulas or equations:

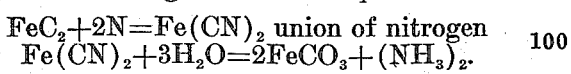

The carbonate of iron thus formed is to be used over and over again in the place of the oxid of iron used for the original charge, in the production or formation of cyanid or ammonia from atmospheric nitrogen. Oxid of iron only, or used collectively with any other metal of a solid nature having the property of forming a carbid and capable of taking the nitrogen and producing a cyanid can be used, instances being magnesium, barium and titanium. Furthermore, any other inert vehicle or carrier for the purpose of rendering the mass less compact and to provide a larger surface for the action of the heat used in liquefaction, can be employed without departing from the spirit of the invention.

I have previously stated that my process is based upon the fact that metal carbids are unsaturated compounds and are capable of forming additional products under the proper conditions and temperatures. For example—

being the structural formula for solid metal carbid, but two of the eight bonds of the two carbons being satisfied by the bivalent metal carbid; the other six are satisfied by the affinities between the two carbons for each other, which is not a very strong combination. Now if this compound be heated in the presence of some element having a stronger affinity for carbon than carbon has for itself, the bonds between the two carbons will open, and the new and stronger element will attach itself to the carbons of the carbid to form a saturated compound, nitrogen for instance passed through heated carbid of barium or iron under proper condition will, at certain critical temperatures, combine with the carbid, forming a cyanid of barium. Thus:

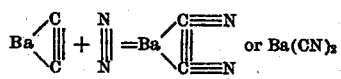

or

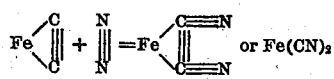

In the solid compound thus formed therewith at certain other temperatures, the affinity of the metal base of the carbid for carbon is so changed or intensified that such nitrogen as may have been received or absorbed in the first instance may be delivered to a substance capable of combining therewith, such as hydrogen of water or steam and the nitrogen liberated therefrom in nascent form capable of uniting with the hydrogen. The present invention therefore contemplates the utilization of these properties of solid metal carbid by using iron carbid or iron and coke in the chemical proportions of a carbid, individually or in combination with other metal carbid for the securing of nitrogen and fixation of the same to and with hydrogen in a progressive or alternating and continuous manner, thereby producing a cumulative yield of ammonia.

It will be understood, in view of the foregoing specification, that the present invention consists, first, of the new process producing a cyanid; second, the new process of producing ammonia; third, the complete process involving the production of the cyanid and the subsequent evolution of ammonia in gaseous form.

In the accompanying drawings: Figure 1 is a vertical section of a crucible or retort furnace adapted for carrying out my process for producing metal cyanid; Fig. 2, a side elevation at right-angles to Fig. 1, with certain parts in section and others broken away to disclose the interior of the apparatus; and Fig. 3, a vertical section of a furnace which may be used for the derivation of nitrogen from air.

I do not limit myself to the use of the furnace shown in Figs. 1 and 2 for the production of the metal cyanid, but I lay claim to this furnace as an independent invention. I do not limit myself to any apparatus for the derivation of nitrogen to be used in my process, the furnace shown in Fig. 3 merely disclosing one method of deriving nitrogen. The nitrogen may be derived from the air in any preferred manner. The combustion furnace shown in Fig. 3 may be used for that purpose.

$1^a$ represents a closed brick furnace having a grate $2^a$, a suitable ash pit therebelow, a combustion chamber thereabove and a suitable lining $2^b$ for the combustion chamber. At $7^a$ there is shown a take-off pipe or flue for the furnace gases. Contained within the combustion chamber and surrounded thereby so that the products of combustion may have access to the entire exterior thereof, is a fire-clay retort $8^a$ having an air inlet pipe $10^a$ and an outlet pipe $9^a$ extending through the furnace wall. A hopper $5^a$ having a closure $5^b$, is provided with a base or support $6^a$ which constitutes a cover for the furnace $1^a$. The lower part of the hopper passes through an opening in the top of the retort or crucible $8^a$. Suitable doors for the ash pit and combustion chamber are provided for the introduction of the fuel and withdrawal of the ashes. Coke contained in the hopper $5^a$ is fed into the retort or crucible $8^a$ and after the coke is heated to a red heat, air is admitted through the pipe $10^a$ and passing through the coke in crucible or retort $8^a$, in the form of nitrogen and carbon dioxid, passes into pipe $9^a$, whence it may be conducted to an absorption tower and the carbon dioxid absorbed by milk of lime, leaving the nitrogen free for future use in my process which may be carried out by the furnace of Figs. 1 and 2.

Referring to Figs. 1 and 2, 1 represents a closed fire-brick furnace having a lining 2. The furnace is braced in any suitable manner as by angle-irons 3 and tie rods 4, and it is provided with a cover 5 which is secured to the furnace by bolts 6 and serves as a support to an automatic hopper or magazine 7 having a suitable closure 7×. Within the furnace 1 is a bottomless crucible 8 provided with a lid 9 which has an opening to receive the lower end 10 of the hopper 7 so that the hopper may discharge into the crucible. The upper part of the crucible is of general elongated and flat form and it then contracts as at 14ª, but remains of the same length as in its upper part. From the point $a$ the crucible again expands or flares as at $b$ and finally has its open and bottom part resting in a recess in the walls 1 as at $b'$. Consequently there is formed below the part $b$ and within the furnace, a chamber $d$. At 14 and 15 are provided arched, perforated walls joining the crucible to the interior walls of the furnace 1. The walls 14 and 15 retain and reflect the heat. A combustion gas outlet 17 is for the purpose of taking off the heat and products of combustion after they have done their work on the crucible. A pipe 12 which communicates with the space or chamber $d$, is for the admission of free nitrogen. The furnace shown in Fig. 3 may be utilized for the derivation of the nitrogen which is delivered to the pipe 12, or, such nitrogen may be derived from the air by other means and delivered to pipe 12. Suitable controlling means, such as a valve, may be provided for regulating the quantity and times when the nitrogen is admitted through the pipe 12, according to requirements. An excess of nitrogen should be admitted under super-atmospheric pressure, preferably one plus atmospheres. Gas or gaseous fuel burners $c$ project through the walls 1 on opposite sides of the furnace and are arranged so that the flame therefrom is directed to the contracted portion $a$ and, upwardly against the part 14ª of the crucible and below the wall 14 so that the greatest degree of heat applied to the contents of the crucible is at the point $a$ or substantially thereat, and, to almost as great a degree, upwardly along the walls of the part 14ª. The burners $c$ are connected to their pipes 11 and are provided with valves 11ª by which they may be controlled.

Oxid of iron which is first mixed with coke, coal, tar or pitch in sufficient proportions to reduce the iron and produce a coked product containing carbon, represented by the formula $FeC_2$, as previously explained, is fed into the hopper 7, whence it passes to the crucible 8, as needed. The heat from the burners $c$ acting on the mixture effects a reduction of the iron and its combination or union with the carbon out of contact with air. This mass passes through the zone of fusion in the crucible and becomes liquefied and drips into the chamber $d$ below. The temperature requisite to effect this liquefaction is under 1150° C. Free nitrogen under super-atmospheric pressure, being admitted through pipe 12 into chamber $d$, combines with the liquefied and dripping carbid. The union of the heated dripping liquid carbid with the nitrogen under super-atmospheric pressure, forms a liquid pool of cyanid, $Fe(CN)_2$ which forms, as it cools, a pig P in the bottom of the furnace and may be withdrawn, when cool, through the normally closed opening 16 and afterward crushed or pulverized and then subjected to the chemical action of water or superheated steam. This latter step causes the liberation of ammonia in gaseous form and the cumulative yield of ammonia can be absorbed in water, compressed to a liquid, combined with other elements, etc., as previously explained. As previously explained, any other metal that has the property of forming a carbid and is capable of taking on nitrogen and producing a cyanid may be used with iron oxid, as oxid of iron combined with magnesium, barium or titanium, etc.

It is desirable that the nitrogen admitted through pipe 12 be in excess of the amount required by the fluid carbid in the formation of the cyanid and that the pressure of the nitrogen be greater than one atmosphere, so as to increase the yield in a given period of time. At 1150° C. nitrogen is absorbed somewhat slowly by the liquid carbid and as the temperature increases, it is absorbed more rapidly and finally at about 1850° C. very energetically; indeed almost violently. Above 1850° C. the absorption is slower and finally ceases at still higher temperatures. I do not limit myself to exact temperatures or pressures.

Having thus described my invention, what I claim as new and desire to secure by Letters Patent, is:—

1. The process of making a cyanid, consisting, first, in producing a metal carbid by the fusion of oxid of iron and a carboniferous material and, second, subjecting the liquid carbid thus formed to the action of nitrogen.

2. The process of making a cyanid, consisting, first, in heating oxid of iron in the presence of a carboniferous material to produce a carbid and, second, subjecting the carbid thus formed to the action of nitrogen.

3. The process of making a cyanid, consisting in fusing oxid of iron and a carboniferous substance and subjecting the liquefied carbid thus formed to the action of nitrogen under super-atmospheric pressure.

In testimony whereof, I hereunto affix my signature in presence of two witnesses.

HENRY WHITING LAMB.

Witnesses:
 DAVIS L. HODSDEN,
 U. F. WADDY.